United States Patent [19]

Sano et al.

[11] Patent Number: 4,883,683
[45] Date of Patent: Nov. 28, 1989

[54] METHOD FOR PREPARATION OF SOLID FOODSTUFFS

[75] Inventors: Hiroyuki Sano, Kishiwada; Masatoshi Kizaki; Yukiya Iwanaga, both of Sennan, all of Japan

[73] Assignee: Fuji Oil Company, Limited, Osaka, Japan

[21] Appl. No.: 285,024

[22] Filed: Dec. 16, 1988

Related U.S. Application Data

[63] Continuation of Ser. No. 71,705, Jul. 8, 1987, abandoned.

[30] Foreign Application Priority Data

Jul. 10, 1986 [JP] Japan ................... 61-163206

[51] Int. Cl.$^4$ .......................... A23C 20/00; A23J 1/20
[52] U.S. Cl. .................................... 426/582; 426/602; 426/656; 426/657
[58] Field of Search ................ 424/602, 656, 657, 582

[56] References Cited

U.S. PATENT DOCUMENTS 4,194,018  3/1980  Hodel et al. ............... 426/582 X
4,309,691 12/1981  Sand et al. ................ 426/582 X
4,397,878  8/1983  Koide et al. .............. 426/582 X Primary Examiner—Donald E. Czaja
Assistant Examiner—Celine T. Callahan
Attorney, Agent, or Firm—Wenderoth, Lind & Ponack

[57] ABSTRACT

A method for preparation of solid foodstuff comprises reacting an alkaline earth metal-type solidifying agent with an emulsion comprising soybean protein, a casein, oils and fats and water with heating. According to this method, mixing and emulsification of raw materials can be performed in a shortened period of time. In spite of agitation with heating, products free from sandy feeling or dryness and crumbling but having an excellent melt in the mouth can stably be obtained.

5 Claims, No Drawings

METHOD FOR PREPARATION OF SOLID FOODSTUFFS

This application is a continuation of now abandoned application Ser. No. 071,705 filed July 8, 1987.

FIELD OF THE INVENTION

The present invention relates to a method for preparation of solid foodstuffs such as cheese-like foodstuffs comprising soybean protein, casein, oils and fats and water as essential ingredients.

BACKGROUND OF THE INVENTION

Brief Description of the Prior Art

Upon preparation of solid foodstuffs such as cheese or the like using soybean protein, various problems caused by heating have been pointed out heretofore.

For example, in Published Examined Japanese Patent Application No. 6107/1974, there is described a method for producing processed cheese-like foodstuffs which comprises kneading a mixture mainly composed of soybean protein isolate having a low gelation ability, casein (preferably, water-soluble casein) [preferred ratio of both is 1 : (1 to 0.5)] and oils and fats while adding water to the mixture without heating, then sealing the kneaded mixture in a casing, and heating to cause gelation. According to this method, it is important to conduct the kneading without heating; it is described that if the kneading is performed with heating, gel of soybean protein formed by heating is destroyed by mechanical agitation operation and it thus becomes impossible to form a continuous phase of tight protein so that the tissue of the product becomes sandy and cheese-like foodstuffs cannot be obtained.

Further in Published Unexamined Japanese Patent Application No. 146237/1983 there is described a method for producing cheese-like foodstuffs which comprises kneading protein mainly composed of vegetable protein (preferably soy protein isolate) (which may also contain sodium caseinate, etc. in a half amount or less than the amount of protein) with oils and fats and water and allowing the mixture to stand at 0° to 60° C. for 20 minutes or longer thereby to cause gelation. It is described there that when the kneaded matter is heated, texture of the product becomes dry and crumbly and lacks smoothness, and the product shows poor melting feel to the tongue.

Further it is pointed out in Published Unexamined Japanese Patent Application No. 108333/1986 that by referring to the method as described in Published Examined Japanese Patent Application No. 6107/1974 described above, the product mainly composed of soybean protein provides dry and crumbly texture but lacks cheese-like smoothness; and by referring to the method described in Published Unexamined Japanese Patent Application No. 146237/1983 described above, vegetable protein is hydrated only with difficulty due to poor affinity of the vegetable protein to water so that protein particles remain to provide poor touch to the tongue and bad texture. It is thus described in Published Unexamined Japanese Patent Application No. 108333/1986 that the method of adding protein, oils and fats and acids simultaneously and then agitating, the method of agitating protein and oils and fats while adding water thereto, etc. are not suitable; and good solid foodstuffs are obtained only in the case that raw materials are mixed in a specific order, namely, phosphates and/or citrates (if necessary, table salt in addition thereto) to water, dissolving the mixture, heating the solution, adding protein, edible oil and fats and organic acids in this order and stirring the mixture. According to this method, the addition and agitation of these raw materials are carried out with heating.

As a result of investigations made by the present inventors relative to the prior art described above, it has been found that the methods described in Published Examined Japanese Patent Application No. 6107/1974 and Published Unexamined Japanese Patent Application No. 146237/1983 encounter difficulties that the methods do not make the best use of good physical properties possessed by casein, since these methods are quite different from the mixing action upon melting with heating while agitating with melted salts during conventional steps of manufacturing processed cheese. In addition, these methods involve a serious restriction in using rennet-casein that has the most excellent flavor among the casein. In particular, the method described in Published Unexamined Japanese Patent Application No. 146237/983 does not involve heating to 60° C. or higher at steps subsequent to a kneading step so that there is a problem in storability of the product.

Further the present inventors have already found a method which eliminate difficulties of causing separation or protein particles remaining during the manufacturing steps or failing to give products, etc., without relying upon the specific addition method described in Published Unexamined Japanese Patent Application No. 108333/1986 [method which comprises adding phosphates and/or citrates (if necessary, additionally adding table salt thereto) to dissolve them, then adding in this order, protein, oils and fats and oganic acids and agitating the mixture]. However, the solid foodstuffs produced by these methods have defects that as the amount of the soybean protein used increases, texture around the tooth dissimilar to cheese might be caused or plasticity like clay becomes predominant to reduce elasticity of the bodies, and if such becomes markedly serious, a solid body cannot be obtained. The present inventors have come to recognize that these defects should be removed.

As a result of extensive investigations aiming at preparing solid foodstuffs having good texture mainly composed of soybean protein, casein, water and oils and fats via steps of heating and agitation, the present inventors have accomplished the present invention.

SUMMARY OF THE INVENTION

Namely, the present invention is directed to a method for preparation of solid foodstuffs which comprises reacting alkaline earth metal-type solidifying agents with emulsions containing soybean protein, casein, oils and fats and water with heating.

DETAILED DESCRIPTION OF THE INVENTION

As the soybean protein which can be used in the present invention, there are used soy protein extract, soy protein concentrate and soy protein isolate; among them, soybean protein having a crude protein content of at least 60% and a low ability of gelation is generally preferred. When the crude protein content in the soybean protein is low, texture of the product is poor. Further as the ability of gelation becomes high, the amount of the soybean protein relative to the casein becomes greatly limitative upon preparation of the emulsion by agitation with heating. For example, when using soybean protein that is not gelled after homogenizing 12 g of powdery protein with 88 ml of table salt having a concentration of 2.5% at 10,000 r.p.m. for 3 minutes using a whirling blender, centrifuging, defoaming, then heating at 80° C. for 30 minutes and finally quenching with water, a good state of an emulsion can be obtained even though the ratio of the soybean protein formulated to the casein exceeds approximately 2/1 (calculated as a solid weight); when using such soybean protein having a high ability of gelation that is gelled by the above measurement method, however, an appropriate formulation ratio is approximately 1/1 or less. In general, the ratio of the soybean protein to be formulated to the casein is in a range of approximately 1/5 to approximately 3/1. The lower the gelation ability of the soybean protein, the larger the relative amount to the casein.

As the casein, there can be used rennet-casein, acid casein, caseinates, etc., which may also be derived from cheese (including imitation type cheese). In the present invention, even casein that is sparingly soluble in water can be used together with known melted salts (various phosphate, sodium citrate, etc). That is, according to the present invention, rennet-casein having excellent flavor can be used advantageously, without causing any inconvenience.

It is advantageous that the oils and fats be used generally in an amount of 0.3 to 1.7 parts per 1 part of the protein (soybean protein and casein in total). When the amount of the oils and fats is too small, flavor of the product is bad. When the amount of the oils and fats is too large, it is difficult to emulsify the system. Examples of the oils and fats include, in addition to milk fat, rapeseed oil, soybean oil, sunflower seed oil, cotton seed oil, peanut oil, rice bran oil, corn oil, safflower oil, olive oil, kapok oil, palm oil, coconut oil, palm nucleus oil, fish oil, beef tallow, lard; or hardened oil, fractionated oil and ester exchange oil thereof; or mixtures thereof; etc.

It is appropriate that water be used in the emulsion, in a range of 30 to 60%, preferably 35 to 55%. Water can be derived from the respective ingredients formulated such as soybean protein, casein, etc. or water can be separately supplied in the form of water or steam. When the amount of water in the emulsion is too small, it is difficult to obtain the emulsion due to poor hydration of the soybean protein and when the amount is too large, the emulsion releases water upon contact with the alkaline earth metal-type solidifying agents even if the system is emulsified.

Formation of the emulsion containing the soybean protein, oils and fats and water described above, is not limited to the specific addition method described in Published Unexamined Japanese Patent Application No.108333/1987 [method which comprises adding phosphates and/or citrates (if necessary, table salt) to water to dissolve them, adding to the solution protein, edible oils and fats, and organic acids in this order and, agitating the mixtare] but can also be made by the following methods. Namely, there are a method which comprises previously dispersing at least powdery soybean protein and preferably powdery casein in oils and fats, adding water having dissolved therein melted salts or alkalis to the dispersion and elevating the temperature while agitating the mixture; a method which comprises adding sodium caseinate and oils and fats to soybean protein which is not subjected to spray drying or previously hydrated in water and agitating the mixture with heating; etc. In order to prepare a product free from isolation of oils and fats, free from dry and crumbly feeling and having smooth body, it is important, for the present invention, to react the alkaline earth metal type solidifying agent to once prepare such an emulsion. Further agitation with heating at 80° C. or higher during the preparation of the emulsion results in melting casein and such contributes to improving good body.

In the present invention, one of the most characteristic features lies in using the alkaline earth metal type solidifying agent. The use of the alkaline earth metal type solidifying agent is effective to improve the difficulties in physical properties of the product obtained by heating the aforesaid raw materials including soybean protein. That is, as the amount of the soybean protein used increases, texture around the tooth dissimilar to cheese might be caused and, plasticity like clay becomes predominant to reduce elasticity of the bodies and if such becomes markedly serious, a solid body cannot be obtained; and the solidifying agent is also effective to prepare a hard body. As the alkaline earth metal type solidifying agent, there can be used calcium sulfate, calcium chloride, calcium lactate, magnesium sulfate, magnesium chloride, etc. An optimum amount of the solidifying agent to be added somewhat varies depending upon the kind of solidifying agent, and further the action of the alkaline earth metal type solidifying agent can be relieved or controlled using substances having a chelating action such as citric acid, etc. in combination; however, the alkaline earth metal type solidifying agent is generally used in a range of 0.05 to 5% calculated as the amount of the alkaline earth metal (calcium or magnesium) based on soybean protein. When the amount is too small, the effect to be brought about by the addition cannot be expected, and when the amount is too large, undesired bitter taste is exhibited. In addition, sandy feeling might be caused in the product in the case of the water-soluble solidifying agent.

In addition to the components described above, the product may generally contain table salt, flavors (cheese flavor, etc.), sweeteners and colorants and may additionally contain optional components such as pH controlling agents (which adjust pH of the product to 5 to 7), pastes (carragheenan, guajak gum, gum arabic, etc.), starches, defatted skim milk, emulsifying agents (propylene glycol fatty acid esters, polyglycerol esters, sorbitan fatty acid esters, glycerine fatty acid esters, lecithin, etc.), fruit juices, etc. These components may be incorporated at any step prior to the final agitation step; particularly in case that soybean protein is used in a relatively large amount, it is preferred that components such as table salt and acids, etc. which prevent dissolution or emulsification of soybean protein be incorporated in the system after the emulsification, since such maintains the emulsion added with alkaline earth metal type solidifying agents in a good state.

As the means for the agitation used in the present invention, a vacuum cutter, a silent cutter, a cheese melting vessel, etc. can be used. It is preferred that the temperature for the agitation with heating be at 80° C. or higher. When the temperature is too low, the casein melts insufficiently, which fails to make the best use of the physical properties of the casein.

According to the present invention, a representative example of the solid foodstuffs is cheese-like foodstuff but the cheese-like foodstuff may also have a flavor different from cheese flavor, for example, fruit-like flavor. The point is that the foodstuffs of the present invention include those having a solid cheese-like body.

EXAMPLES AND COMPARATIVE EXAMPLES

Hereafter, the present invention will be explained by referring to the Examples and Comparative Examples below.

EXAMPLE 1 AND COMPARATIVE EXAMPLES 1 AND 2

In a cheese melt vessel of a 5 kg treatment capacity were preliminarily mixed 14 parts of commercially available soy protein isolate ("FUJIPRO CL", manufactured by Fuji Oil Co., Ltd.) having a low gel forming ability (which was not gelled even after homogenizing 12 g of powdery protein in 88 ml of an aqueous table salt solution having a 2.5% concentration for 3 minutes at 10,000 r.p.m. using a whirling blender, centrifuging, defoaming, heating at 80° C. for 3 minutes and then quenching with water to normal temperature; viscosity, 2000 c.p.), 13 parts of powdery rennet-casein and 29 parts of vegetable oils and fats having a melting point of 36° C. A solution of 2.4 parts of melted salts (sodium secondary phosphate.12 hydrate and sodium citrate) in 32 parts of water was charged in the vessel. While blowing steam (approximately 8 parts) into the system until the temperature of the system reached 92° C and maintaining the same temperature, agitation was performed for about 12 minutes to emulsify the system. Solution of 0.6 parts of citric acid and 1.4 parts of table salt in 4 parts of water was then added to the emulsion. After the agitation was continued for a further minute, the system was defoamed and allowed to stand to cool. This product was free from dryness and crumbling and also free from isolation of the oils and fats so that cheese-like products having good melt to the tongue and smooth body were obtained.

For purposes of comparison, the foregoing procedure was performed in a similar manner with respect to the case in which no calcium chloride was added and the amount of citric acid was changed to 0.75 parts (Comparative Example 1), and with respect to the case in which commercially available soy protein isolate powders ("FUJIPRO R", manufactured by Fuji Oil Co., Ltd.) having a low gel forming ability (which was gelled according to the measurement method described above) and no calcium chloride was added (Comparative Example 2). In the case of Comparative Example 2, no emulsification occurred for the same time period of heating and agitation and even though the time period for heating and agitation increased, no emulsification proceeded. Further in the case of Comparative Example 1, the product had excessively soft texture and inferior texture around the tooth, and the tissue had poor elasticity.

|  | Example 1 | Comparative Example 1 | Comparative Example 2 |
|---|---|---|---|
| Moisture content | 43.7% | 44.2% | — |
| pH | 5.8 | 5.8 | — |
| Hardness | 930 | 510 | — |

Hardness: After storing at 7° C. for 5 days, hardness was measured under conditions of a plunger diameter of 5 mm and a rising rate of 2 cm/min. using "Rheometer (NMR 2002J)"manufactured by Fudo Industry Co., Ltd.

EXAMPLES 2 TO 4

A cheese-like foodstuff was prepared in a manner similar to Example 1 except that 0.2 parts of calcium chloride (Example 2), 2.2 parts of calcium lactate (Example 3) or 0.98 parts of calcium sulfate (Example 4) was used in place of 0.8 parts of calcium chloride, respectively (provided that calcium sulfate was used in the form of an aqueous dispersion because it was sparingly soluble in water). The products were hard to some extent but the product of Example 4 was inferior to the products of Examples 2 and 3 in that it was somewhat sandy.

|  | Example 2 | Example 3 | Example 4 |
|---|---|---|---|
| Moisture content | 44.0% | 43.8% | 44.5% |
| pH | 5.9 | 5.8 | 5.8 |
| Hardness | 800 | 780 | 640 |

COMPARATIVE EXAMPLE

The agitation for emulsification was carried out in a manner similar to Example 1 except that calcium chloride was added at the same time as when water was added upon emulsification. However, the oils and fats were separated to cause no emulsification. Even though the agitation was prolonged for further 10 minutes, the state was not changed.

EXAMPLE 5

The procedure was performed in a manner similar to Example 2 except that the amounts of soy protein isolate and rennet-casein were changed to 18 parts and 9 parts (this example) and 22 parts and 5 parts (Comparative Example). In this example, an emulsified state was obtained by prolonging the emulsifying time period for further 5 minutes and, the product was good. However, in the comparative example, the emulsified state was destroyed upon the addition of calcium chloride and no solid product could be obtained, although an emulsified state was apparently obtained by prolonging the emulsifying time period for further approximately 10 minutes.

EXAMPLE 6

A product was obtained in a manner similar to Example 1 except that neither rennet-casein nor melted salt was used but sodium caseinate was used. This product had almost the same physical properties and texture as in the product of Example 1.

As has been described above, according to the method of the present invention, mixing and emulsification of raw materials can be performed in a shortened period of time. In spite of agitation with heating, products free from sandy feeling or dryness and crumbling but having an excellent melt to the tongue can stably be obtained.

While the invention has been described in detail and with reference to specific embodiments thereof, it will be apparent to one skilled in the art that various changes and modifications can be made therein without departing from the spirit and scope thereof.

What is claimed is:

1. A method for preparation of solid foodstuff which comprises providing an emulsion comprising soybean protein, a casein, oils and fats and water, adding an alkaline earth metal-type solidifying agent selected from the group consisting of calcium sulfate, calcium chloride, calcium lactate, magnesium sulfate and magnesium chloride to said emulsion, and reacting said solidifying agent with said emulsion under heating, said alkaline earth metal-type solidifying agent being used in an amount of 0.05 to 5% calculated as the amount of the alkaline earth metal based on said soybean protein, the ratio of said soybean protein to said casein being in a range of approximately 1//5 to 3/1, said oils and fats being used in an amount of 0.3 to 1.7 parts per 1 part of the total amount of said soybean protein and casein, said soybean protein having a crude protein content of at least 60%, and said water being used in said emulsion in an amount of 30 to 60%.

2. A method for preparation of solid foodstuff as claimed in claim 1 wherein said emulsion comprising soybean protein, a casein, oils and fats and water is prepared under agitation with heating.

3. A method for preparation of solid foodstuff as claimed in claim 1 wherein said soybean protein is a member selected from the group consisting of soy protein isolate, soy protein concentrate and soy protein extract.

4. A method for preparation of solid foodstuff as claimed in claim 1 wherein said casein is a member selected from the group consisting of rennet-casein, acid casein and caseinates.

5. A method for preparation of solid foodstuff as claimed in claim 4 wherein said casein is rennet-casein.

* * * * *